United States Patent
Maes et al.

(10) Patent No.: US 10,986,479 B2
(45) Date of Patent: Apr. 20, 2021

(54) SERVICE MANAGEMENT AND PROVISIONING FOR TENANT SERVICE INSTANCES

(71) Applicant: EntIT Software LLC, Sunnyvale, CA (US)

(72) Inventors: Stephane Herman Maes, Fremont, CA (US); Ulrich Feyer, Aidlingen (DE); Srikanth Natarajan, Fort Collins, CO (US)

(73) Assignee: MICRO FOCUS LLC, Santa Clara, CA (US)

( * ) Notice: Subject to any disclaimer, the term of this patent is extended or adjusted under 35 U.S.C. 154(b) by 107 days.

(21) Appl. No.: 15/873,778

(22) Filed: Jan. 17, 2018

(65) Prior Publication Data

US 2019/0222988 A1     Jul. 18, 2019

(51) Int. Cl.
| | |
|---|---|
| *H04W 4/50* | (2018.01) |
| *H04L 29/08* | (2006.01) |
| *H04L 29/12* | (2006.01) |
| *G06F 8/61* | (2018.01) |
| *H04L 12/24* | (2006.01) |
| *H04L 12/26* | (2006.01) |
| *H04W 4/20* | (2018.01) |

(52) U.S. Cl.
CPC ............... *H04W 4/50* (2018.02); *G06F 8/61* (2013.01); *H04L 41/5035* (2013.01); *H04L 41/5054* (2013.01); *H04L 61/1511* (2013.01); *H04L 67/10* (2013.01); *H04W 4/20* (2013.01); *H04L 43/08* (2013.01)

(58) Field of Classification Search
CPC ..... G06F 8/20; G06F 8/61; G06F 8/70; G06F 8/77; G06F 9/44; G06F 9/45558; G06F 2009/4557; G06F 2009/45595; G06F 13/00; G06G 13/00; G06Q 30/02; H04L 12/24; H04L 12/26; H04L 29/06; H04L 29/08; H04L 29/12; H04L 29/0809; H04L 29/06047; H04L 29/08072; H04L 43/08; H04L 41/12; H04L 41/14; H04L 41/5006; H04L 41/5035; H04L 41/5054; H04L 61/1511; H04L 67/10; H04L 67/327; H04L 67/1031; H04L 67/00; H04W 4/20; H04W 4/50
USPC .......................................... 717/101; 709/203
See application file for complete search history.

(56) References Cited

U.S. PATENT DOCUMENTS

| | | |
|---|---|---|
| 8,539,480 B2 | 9/2013 | Malyshev et al. |
| 2006/0245421 A1 | 11/2006 | Ostapchuk |

(Continued)

OTHER PUBLICATIONS

Tod Golding, "Architecting Next Generation SaaS Applications on AWS", Nov. 2016, 32 pages. https://www.slideshare.net/AmazonWebServices/aws-reinvent-2016-architecting-next-generation-saas-applications-on-aws-arc301.

(Continued)

*Primary Examiner* — Robert B Harrell

(57) ABSTRACT

According to an example, a system may include an instance controller to manage service instances deployed on an infrastructure that facilitates data segregation and performance level compliance. The instance controller deploys a service instance of the service instances in a container and terminates the service instances in response to determining the service suite instance is idle based on the notification. Additionally, the system may deploy a component from the service instance from outside the container.

17 Claims, 7 Drawing Sheets

(56) References Cited

U.S. PATENT DOCUMENTS

2014/0372513 A1    12/2014  Jones
2015/0169291 A1*   6/2015  Dube .................. G06F 8/61
                                                       717/101
2018/0046951 A1*   2/2018  Mohindra ......... G06Q 10/067

OTHER PUBLICATIONS

Frederick Chong, et al., "Architecture Strategies for Catching the Long Tail", Apr. 2006, 18 pages. https://msdn.microsoft.com/en-us/library/aa479069.aspx.
Arthur Cole, "Incorporating Multi-instance Architectures Into a Multi-tenant Cloud", 2016, 5 pages. http://www.stratoscale.com/blog/cloud/incorporating-multi-instance-architectures-multi-tenant-cloud.
Cisco Cloud Network Automation Provisioner, "Sample Database as a Service Deployment", Administrator Portal Guide, Release 2.1, Part: CCAMCP-CNAP-Admin2-2.1, 2014, 30 pages. http://www.cisco.com/c/en/us/td/docs/solutions/Service_Provider/CCAMCP/2-0/CNAP2-Admin/CNAP2-Admin/CNAP2-Admin-AppB.pdt.
Jan Schaffner, "Memory-based Cloud Architectures", 2009, 29 pages. https://hpi.de/fileadmin/user_upload/fachgebiete/plattner/teaching/TrendsandConcepts/2010/Schaffner_MemoryBasedCloudArchitectures.pdf.
Maximilian Schneider, et al., "Versioning for Software as a Service in the Context of Multi-tenancy", Jul. 2013, 14 pages. http://www.freenerd.de/assets/VersioningSaas_SchneiderUhle.pdf.

* cited by examiner

SERVICE MANAGEMENT AND PROVISIONING FOR TENANT SERVICE INSTANCES

BACKGROUND

The recent trend of providing Software as a Service (SaaS) instead of traditional retail channels has changed the way that software is offered, licensed or sold. Software applications may be purchased and installed on-premises, such as installed on servers and networks managed by the entity using the software. A more recent approach is to provide software applications as SaaS. For an application offered as SaaS, the application is installed on a cloud or other remote network, and the application is managed by the SaaS service provider. Users may subscribe to SaaS by paying a recurring fee or by agreeing to other terms, such as paying per use, and may be able to always utilize the most recent version of the application without worrying about installation, upgrades and much of the operational management of the application.

Also, in some instances, some applications may be deployed locally (on-premise) or use some local components for the applications provided as SaaS. When a customer deploys software packaged in a suite, such as an integrated set of applications or a bundle of applications that are to be integrated possibly by the customer or other systems, the customer may decide to not install all the pieces of the software (e.g., because they have already a same, older or customized version of the software or an equivalent software that provides these features). In such cases, one needs to be able to point to the different applications or services in order to specify where the other applications are located. This allows the other applications of the suites or integration involving them to find the components not installed as expected and conversely the components not installed with the suite can find the components of the suites. This often has to be something that is setup when the software is installed. Also, there are cases when the components that provide the missing functions change (e.g., use different ones for different use cases, etc.) so that needs to be also dynamically reconfigurable.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1A:
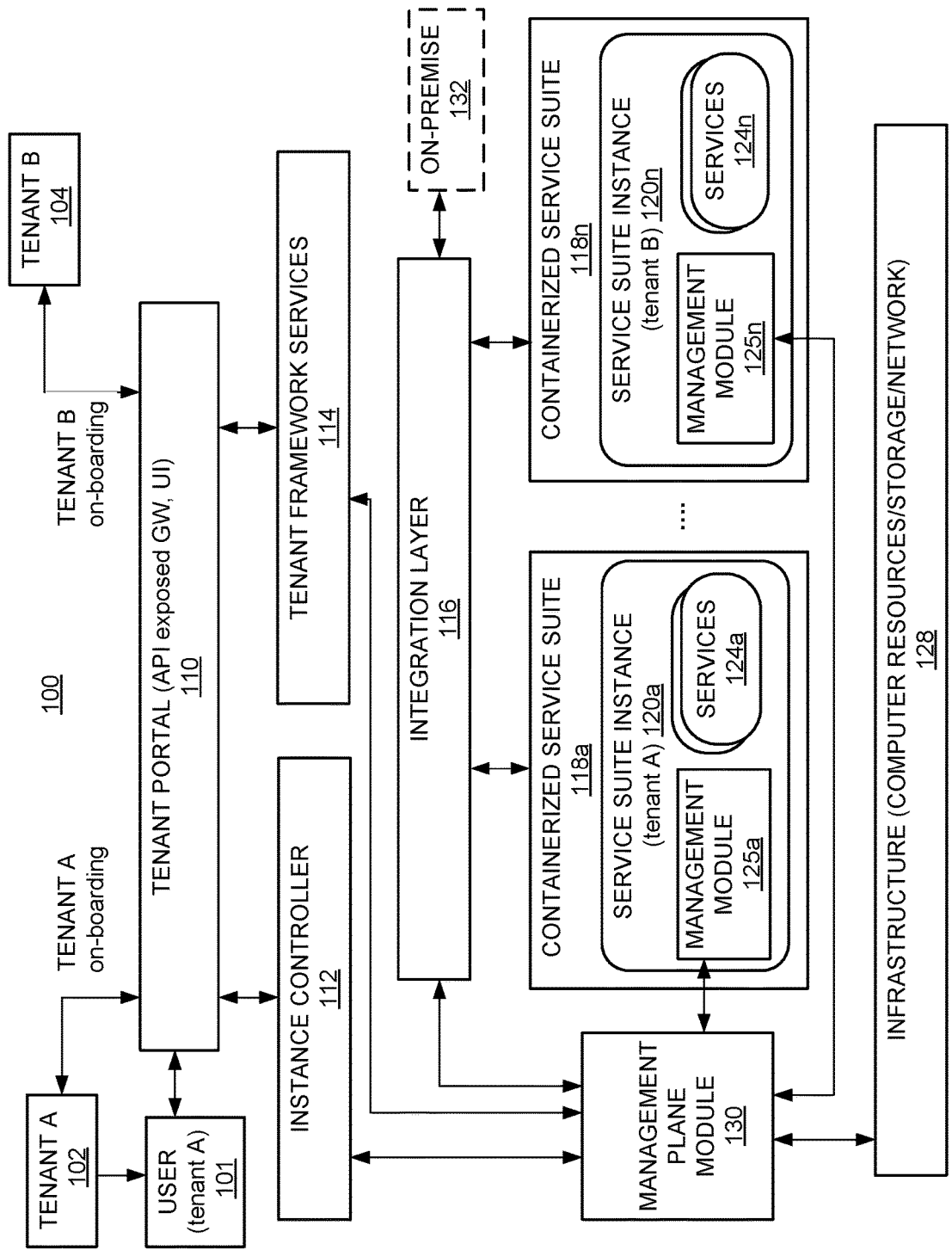
FIGS. 1A-B show diagrams of an example service provisioning system.

For simplicity and illustrative purposes, the present disclosure is described by referring mainly to an example thereof. In the following description, numerous specific details are set forth in order to provide a thorough understanding of the present disclosure. The present disclosure may be practiced without limitation to these specific details. As used herein, the terms "a" and "an" are intended to denote at least one of a particular element, the term "includes" means includes but not limited to, the term "including" means including but not limited to, and the term "based on" means based at least in part on.

A service suite implemented as a bundle of applications or a standalone service may be available for installation and utilization by a user on a cloud or on-premises. According to an example of the present disclosure, a single-tenant application (with a single-tenant logic) built for deployment or use by a single tenant (i.e., not having multitenant logic) can also now be offered as a multitenant offering (e.g., as SaaS). Multi-tenancy may include a single instance of a software application and the supporting infrastructure that serves multiple customers. For example, each customer shares the software application and also shares a single database. Single-tenancy may include a software application and the supporting infrastructure for each customer.

According to an example of the present disclosure, a system provides a framework for offering a single service (i.e., application) or service suites containing multiple applications that may not have a built-in multitenant logic, as a service (e.g., SaaS). For example, a single-tenant application may be offered as a multitenant SaaS service by adding multitenancy support and capability including data segregation (in-flights, at rest and in process) while service level agreement (SLA) guarantees and performance are met and not affected by other tenants.

According to an example of the present disclosure, the system may provision services or service suite instances for each tenant (e.g., different set of instances for each tenant). A service suite may include one or multiple services provided by one or multiple applications. For example, multiple applications may be offered or otherwise provided to a user as a bundle or integrated to support a particular need of a tenant. A set of containers implement the components of the application in one example. In another example, a set of containers implement a suite of application. The system may provision to a tenant an instance of a service suite using a pool of shared computer resources, including computer, storage and network resources that may be provided in a cloud and may be referred to as cloud resources or an infrastructure. The expectation of the cloud infrastructure is that it may ensure that the data in-flight and data at rest is segregated and that performances of the infrastructure resources (computer resources, storage, network) are not affected by other tenants. This can be achieved on a public cloud and can be achieved on-premise by imposing by design such requirements. In one example, a service suite instance may also be implemented in an on-premise infrastructure that provides for data segregation and ensures that performance guarantees in service level agreements (SLAs) are achieved. The system may include management modules to manage services and service suite instances and to control user interaction with the services and the service suite instances. Different instances may ensure separation of the transactions, interactions and data in process. A service suite instance may be provisioned to be accessible and usable by a tenant's users based on the tenant's licensing agreement or subscription. The tenant's users are determined based on how the tenant has defined that the users may be identified, authenticated and authorized to interact with a service or a service suite. A tenant may include an entity that subscribes to a service as SaaS offered in a multitenant environment, e.g., on a cloud or on-premise if the infrastructure has the properties for multi-tenancy. A tenant may include a business, a line of business or another type of organization with multiple users, or for SaaS services offered to consumer for example, a tenant may represent an individual user. In one example, the present disclosure may implement or offer a service that controls that the service to be provisioned supports multi-tenancy based on the underlying infrastructure that provides for secure and efficient segregation of data and ensures that SLA and performances are guaranteed. The infrastructure may be implemented as an on-premise data center of a service provider (or customer) or in a private cloud or on a public (or managed) cloud.

In an example, a service application or a service suite instance may be provisioned in a container or a set of containers as a containerized service or a containerized service suite instance. Each containerized service or service suite instance may be associated with a tenant or multiple tenants that may be subscribed to the service suite offered in the cloud. For example, several tenants may have access to services deployed in the cloud. This situation may be referred to as a multitenant system or environment whereby multiple tenants simultaneously utilize service or service suite instances running on a cloud (or on-premise) infrastructure that ensures that the data is segregated and SLA requirements are guaranteed independently of what service or service suite instances are used by the tenants. A service or a service suite instance may include executable copies of the service or service suite applications provisioned on the infrastructure that provides for multitenancy, as for example the cloud resources (storage and network). In one example, a containerized service suite instance may be implemented on a single server hardware infrastructure. In some cases, a cloud may not provide sufficient data segregation, and an additional encryption layer may be added to encrypt data at rest or in transit over a network and/or a virtual network layer may ensure appropriate separation of the traffic. A containerized service or service suite instance may include a management module that can monitor usage of the service or service suite instance and perform other management operations like scheduling/orchestration and scaling in and out of the service and service suite/component instances based on performance. The service or the service suite instances may include various types of applications that do not have a built-in multitenant logic, which may be related and which may be offered as services, such as SaaS. In one example, a single application may be containerized and offered as a service.

The infrastructure on which the service or service suite instances are provisioned may be dedicated or shared. The infrastructure may be able to provide multitenant features at an infrastructure level. Thus, whether a public cloud or a private cloud is used, the infrastructure can segregate a tenant's data from other tenant, including, e.g., encryption and segmentation, and may provide performance independence, which may include satisfying service level agreement (SLA) performance guarantees, load balancing and scaling remediation. In one example, the service or the service suite instances may be provisioned on a hardware-based infrastructure on-premise (for example, on a tenant's data center that may be used as SaaS provider).

In an example, a SaaS framework may perform cloud orchestration operations. For example, the system may employ a management plane that executes identity management to authenticate tenant users based on how it has been agreed upon or setup when the tenant was on-boarded and to allow authorized tenant users to access service or service suite instances that they are authorized to access based on the tenant's on-boarding. Orchestration operations may include instantiation and lifecycle management of service and service suite instances. For example, the containerized service or the service suite instances may be deployed when needed to satisfy user requests on the cloud infrastructure (e.g., a new user of a tenant without running instances is logged in or an existing user adding too much load on the instances of a tenant may necessitate adding a new instance). A management plane may instantiate service suite instances per tenant from a set of container images stored in an image registry. The management plane may associate tenant persistent data that has been stored for that tenant and that is made available to the containers for that tenant with the service or service suite instance. Also, the service or service suite instances may be deployed or terminated to accommodate varying demands or loads. If there is an excessive load, performance issues or a large number of tenant users for the service suite instance, the management plane may decide to scale out, e.g., add an instance (or instances) for that tenant and have some users interacting with one instance and others interacting with the added instance. If the load decreases or users log out, the management plane may scale in, e.g., terminate one or multiple service or service suite instances for the tenant. Then, when no user for that tenant is using the tenant's service suite instances for a certain time period, the management plane may terminate all of the service or service suite instances for that tenant. Also, utilization of service or service suite instances may be tracked to manage and auto-scale the lifecycle of the service or the service suite instances based on loads, performance and SLA compliance. Tracking of loads and usages of the service and the service suite instances provides for correct and efficient routing of the user service requests. In one example, a service or a service suite instance may be deployed at least partially on-premise via an integration layer that supports execution of services deployed on-premise and in a cloud.

In an example, the system may include a management module that manages multiple service and service suite instances. The services provided by the service suite instances may be provided as multitenant SaaS services. The management plane module may include a shared container orchestrator, such as, Kubernetes™ container orchestration, and associated supporting services. In one example, the service and service suite instances may be used as clusters of instances managed by the same container orchestrator. For example, the management module may monitor the service suite or the service instance to determine that the service or service suite instance is idle in order to scale in (e.g., terminate) the instances. When a new tenant signs up (gets on-boarded), the tenant provides a way to uniquely identify the tenant's users. When a new user signs up or logs in, the new user may be redirected to an existing (running) service or a service suite instance of the tenant. This means that other users of the same tenant are already using the applications from the service suite instance. Otherwise, a new service or service suite instance may be created by the orchestrator, if the user is the first user to request a service. A notification of an insufficient load may be used to terminate the service or service suite instance to conserve computer resources and allow other processes to utilize the computer resources that were provisioned for the service or service suite instance being terminated. In one example, a service suite instance may be scaled out when used by too many users or when a load on the instance exceeds a certain limit, which may be defined by the SLA. In this case, an orchestrator may create another service or service suite instance for additional users of the same tenant. Conversely, when the load or a number of tenants is reduced, the orchestrator may scale in the instances of the tenant by retiring some of the service or service suite instances. The system may include an orchestrator in a form of a management plane module coupled to an instance controller that may launch service suite instances and perform other life cycle operations and management operations for services and service suites as is further discussed below.

According to examples of the present disclosure, the use of the containerized service or service suites allows for fast and efficient creation (instantiation), scaling in and out and termination of services (applications) or service suite instances as compared to applications or service suites running on a physical host or inside a virtual machine (VM). The containerization approach may improve the efficiency and decrease the costs of service provisioning. However, the service may still include components that are deployed as VMs or applications running on physical hosts. In such cases, pools of service suites or standalone services residing on physical hosts or virtual service suite instances or services may be allocated by the management plane module and provisioned to the tenant. This provides at least similar speed as a container implementation, but at a higher cost. Also, provisioning of a service (application) or a service suite including multiple services (applications) that are not multitenant by design and by their built-in application logic in a multitenant environment may be provided by the examples of the present disclosure. The cloud infrastructure provides for data segregation, data security and SLA compliance for different tenants on an infrastructure supporting multitenancy.

Also, according to another example of the present disclosure, different components (or subsets of components) of a service suite may be provided within the service suite and external to the service suite.

In FIG. 1A, there is shown a diagram of an example service provisioning system 100. A tenant or a tenant user 101 may request services that may be deployed on an infrastructure 128, which may be provided on a public or a private cloud. The infrastructure 128 may be a shared pool of computer, storage and network resources on which service or service suite instances may be deployed and which provides for at rest and in-flight data segregation, data security (e.g., encryption, segmentation) and SLA compliance. Examples of the computer resources may include processors, memory, network components, hard disks, virtualization software, software for facilitating data segregation, data security and SLA compliance, etc. A service request may include a single service request and requests for service suite instances. For example, a tenant may include an entity that has multiple users and subscribes to service suites for its users. The system 100 may provision service suite instances 120a-n subscribed to by the tenant. The service suite instances 120a-n run on the infrastructure 128 using the infrastructure services assigned to the service suites. The service suite instances 120a-n may be requested after a tenant and its users are registered, so the users can be authenticated and authorized (and possibly charged for billing) by a tenant framework service 114 prior to the system 100 provisioning services 124a-n to the users. In one example, the tenant framework service 114 may be implemented as a SaaS framework.

Figure 1B:
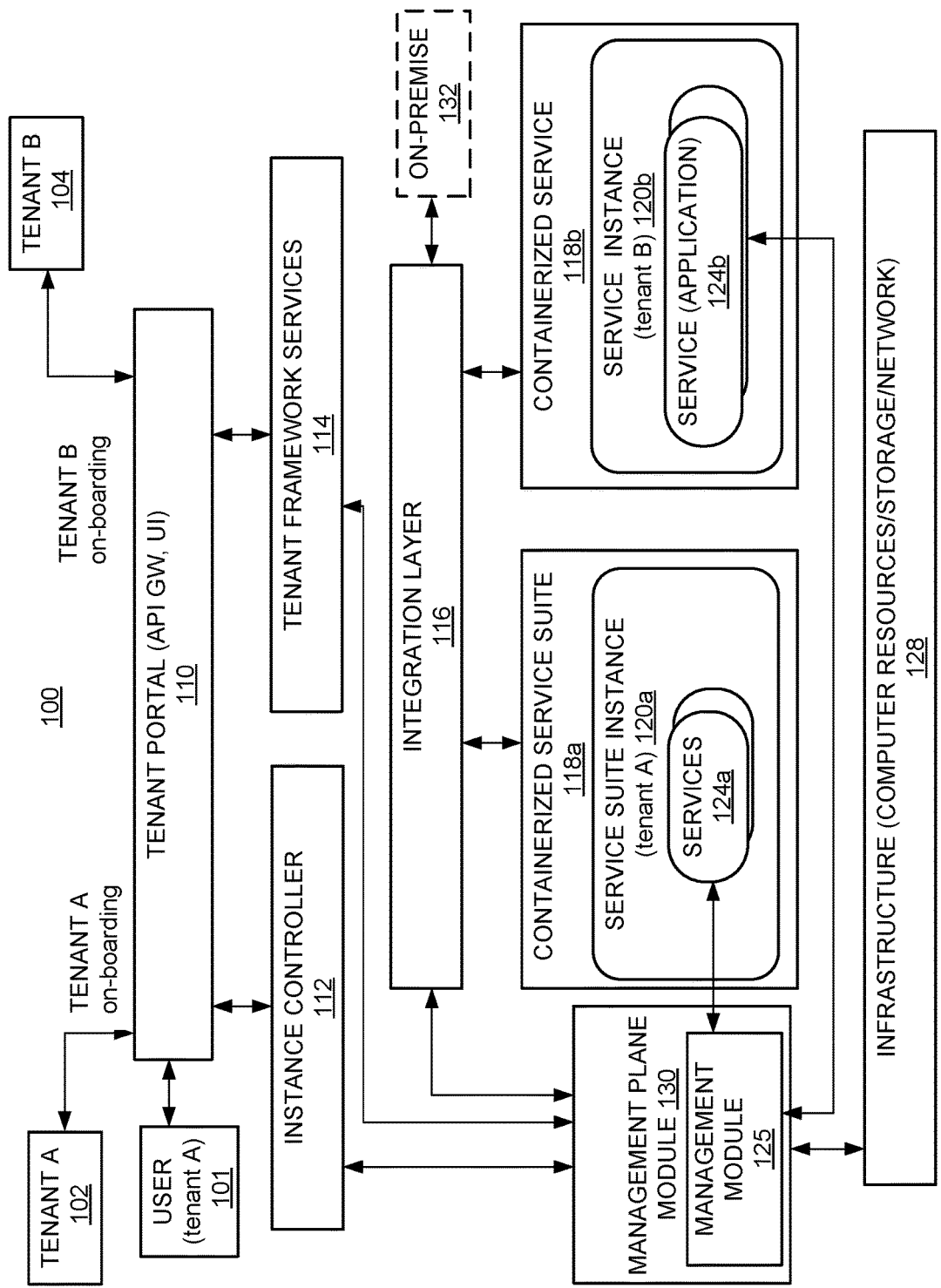

FIG. 1A shows by way of example deployed service suite instances 120a-n, which may include applications running on the resources of the infrastructure 128. The service suite instances 120a-n may be deployed for multiple tenants. A tenant may have different service suite instances and the instances may be scaled. Also, a tenant may have service suite instances that are different from another tenant. A tenant A 102 may get on-boarded through a tenant portal 110 (e.g., SaaS portal) and may provide a way to register or identify and authenticate its users, e.g., user 101 is shown for tenant A. In this example, tenant B 104 also may be on-boarded but does not have any users who are logged in. The tenant A on-boarding may determine what services are available to the tenant's A users. The users may interact with the tenant portal 110 (possibly one instance per tenant) or the users may bypass the tenant portal 110 authorization and access a service suite instance with their credentials directly (via a user interface (UI) or application program interface (API)). In the latter case, the tenant portal 110 behaves as an API exposure gateway (GW), and a user request or an API call is routed to the tenant service suite instance (existing or newly created). In one example, a service suite or a service reside inside different containers. For example, each service 124a-n may be encapsulated inside its own container (or a set of containers if multiple instances have been created by the management module 125a-n). Also, a service suite container may include different service suite instances providing different sets of services (applications) 124a-n. The different containers may be associated with the different service suites. In FIG. 1A, service suite instance 120a is deployed for tenant A and service suite instance 120n is deployed for tenant B. The service suite instances 120a-n may include instances of the same service suite and/or instances of different service suites. Different service suites may have different applications or different versions of applications offered as SaaS's or any other instances, for example, for different lines of businesses, regions, etc. Also, a service suite instance, such as 120a, may be a set of services, such as 124a. Different instances of service suites may have different sets of services. A containerized service suite, such as 118a, may include a set of service suite instances. A container may include a stand-alone application, executable package of software applications including software components for running the applications, such as code, system tools, system libraries, settings, etc. Containers isolate software from its surroundings. For example, processes executing in a container are isolated from processes running on a host operating system (OS) or processes running in other containers. In-flight data and at rest data for the container in a persistent storage associated with services in a container may be similarly isolated (e.g., via virtual network and/or encryption). Data at rest and in-flight may be segregated by the infrastructure 128. For example, service suite instance 120a for the tenant A may access data for the tenant A, but cannot access data for other tenants. A container may include an OS-level virtualization method for deploying and running isolated distributed applications without launching an entire virtual machine for each application. Instead, multiple isolated containers may be run on a single host (or a cloud server) and access a single kernel of the cloud server. The containers may hold the components to provision the services of the service suite instances, such as files, environment variables, libraries, etc. Also, the service suite instances deployed in the system 100 may include their own management plane, shown as management modules 125a-n for service suite instances 120a-n. In one example, a tenant may have several service containers that may have one of the management modules 125 to support them. In one example a common cross-tenant management module may be implemented on the management plane module 130 as shown in FIG. 1B. Referring again to FIG. 1A, each of the management modules 125a-n monitors usage of the service suite, facilitates use of the service suite 118a-n by authorized users by communicating with the instance controller 112, and facilitates management of the service suite 118a-n, including lifecycle management from creation to termination and creating new instances in cases when scaling in and out of the instances is needed. In one example, the management modules 125a-n may route the request, balance the instance loads, and expose service 124a-n APIs. The service suite instances 120a-n may include resources and repositories to be used by the services 124a-n. In one example, the services 124a-n may be loaded from the infrastructure 128 where persistent data may be physically or virtually segregated.

A tenant may have multiple services or service suite instances. Also, a service or a service suite instance for a tenant may be exclusively available to the users of this tenant. A service or a service suite instance may reside on a public cloud or a private cloud (or servers and data centers) segregated in terms of data, performance and access (i.e., an infrastructure as discussed above). In an example, multiple service and service suite instances per tenant may be instantiated over a virtually segregated infrastructure using a virtual private cloud (VPC). The VPC is an on-demand configurable pool of shared infrastructure resources that may be allocated within a public cloud environment, providing a certain level of isolation between the different tenants using the infrastructure. The isolation between one VPC user and all other users of the same cloud (other VPC users as well as other public cloud users) may be achieved through allocation of a private IP subnet and a virtual communication construct (such as a VLAN or a set of encrypted communication channels) per tenant. According to the examples of the present disclosure, multiple service suites for a tenant may include different services (i.e., different sets of applications) subscribed to by the tenant. The service suite instances 120a-n may belong to the same tenant with integration between the containerized service suites 118a-n to support execution of user service requests across the service suite instances 120a-n provided by integration layer 116. In another example, the containerized service sites 118a-n may belong to different tenants A and B as shown in FIG. 1A. The integration layer 116 may be implemented as a gateway, a bus, a message broker or an orchestrator or combination of these elements.

The system 100 may include the tenant portal 110 including an API-exposed GW and a user interface (UI), instance controller 112, tenant framework services 114, integration layer 116 and management plane module 130. The tenant portal 110 may include a gateway or website for users to request and access services and service suites (a user interface (UI) interaction or an API interaction with the gateway). The tenant portal 110 may include graphical user interfaces to authenticate users as being part of a registered tenant and for users to select services and service suites and gain access to deployed service and service suite instances (and GWs to deployed service suite instance via API calls). The tenant portal 110 may not be tenant-specific and may be implemented as a SaaS portal or as an API exposing a GW. The instance controller 112 may respond to user requests for service and service suite instances, orchestrate, create and terminate service and service suite instances by interaction with the management plane module 130, and direct users to currently deployed service and service suite instances. For example, UI or API requests from the user 101 may be associated to the tenant A, and directed to a tenant service or service suite instance if such instance exists or a service suite or a service instance may be created if the user 101 is the first user of the tenant A at the moment. This may be achieved by calling the instance controller 112 that finds running tenant instances or instructs the management plane module 130 to create service or service suite instances to direct the user to. The tenant (or administrator) can use the tenant portal 110 to create accounts for the tenant A and setup how the user 101 of the tenant A can register or be authenticated and authorized. The tenant framework services 114 may perform operations such as identity management, authorizing access, charging a tenant for use of services and service suites, auditing use of services and service suites, and other SaaS-related tenant management services. The integration layer 116 facilitates communication between services across suites for tenants that subscribe to different suites or with external services like other applications (e.g., other vendors) deployed on-premise 132 or services, service suites or suite subsets (e.g., a standalone application deployed apart from the suite). For example, a service suite may comprise multiple applications. A service suite may contain multiple applications and services that may execute user service requests. The service suite may be customized to execute a new user request by employing new compositions of applications and services. In one example, the applications may be composed of different services. As discussed with regard to FIG. 1B below, a service or an application 124b may be offered as a service instance 120b instead of a service suite offered as SaaS. An application in a service suite may be data intensive and may perform data operations at a high rate (e.g., data sent from tenant premises to SaaS devices). The tenant may install and execute the data intensive application of the service suite on-premise 132, because it may be cheaper and may provide better performance to have the application executed on-premise or because the tenant prefers to keep some functionality under direct control on premise (since some applications may be customized). However, the system 100 may deploy services for other applications in the service suite. The system 100 may provide other services or applications in the suite or in the application. For example, a user may decide not to use a universal discover service in an application or not to use the service management application in a suite. The user may have these services provided outside of the suite. However, the user may want to use other services of the suite as SaaS as discussed above. On-premise 132 may include computer resources and applications at the tenant location that are remote from the system 100, but accessible via a network. The integration layer 116 may include APIs that allow the services, e.g., applications, of the service suite installed on the system 100 and installed on-premise to communicate with each other and share data. Additionally, the integration layer 116 may integrate service suite instances 120a-120n (in FIG. 1A) or service suite instances 120a and service instances 120b (in FIG. 1B) with on-premise components. The integration layer 11 may include an API and may perform data integration as well as transformation and orchestration of messages. The management plane module 130 may keep track of deployed service suite instances and perform other operations for managing service suite instances such as scaling in and out of the service suite instances. Operations of the components of the system 100 are further discussed below.

As discussed above, users may access the system 100 via the tenant portal 110 to request services via tenant UI or via an API-exposed GW component of the tenant portal 110 for API calls. For example, a request for a service or a service suite may be received at the tenant portal 110 from a user 101, and the user 101 may be a registered user for the tenant A. The user 101 may be authenticated by the tenant framework services 114. For example, the user 101 accesses the tenant portal 110 via a network to make a request and the request may identify a particular service or a service suite. The service suite may include a plurality of applications. For example, the tenant A may be a corporation and the user 101 may be an employee in an accounting division of the corporation. The requested service suite may include enterprise accounting applications that the user 101 may utilize to perform his or her accounting duties. In another example, the user 101 is an information technology administrator requesting a service suite for data center automation operations. The tenant framework services 114 authenticate the user 101. If the user 101 has permission to use the requested service suite, the tenant portal 110 passes the service request to the instance controller 112. The instance controller 112 may query the management plane module 130 to determine if the tenant A already has the requested service suite instance or instances deployed. The management plane module 130 may maintain a list of deployed services or service suite instances for each tenant.

For example, service suite instance 120a is deployed for the tenant A. If the user 101 is requesting the service suite, which is currently deployed as service suite instance 120a, the management plane module 130 may inform the instance controller 112 that a service suite instance is deployed for the requested service suite instance, and directs the user 101 to the service suite instance 120a. For example, the instance controller 112 may instruct the management plane module 130 to give user 101 access to the service suite instance 120a, and the management plane module 130 may send a service provisioning request to the management module 125a inside the containerized service suite 118a. The tenant portal 110 (or API exposure GW) may receive from the instance controller 112 some information on what service suite instance is associated with the tenant and on what traffic is directed to that instance. Once the request reaches the containerized service suites 118a-n, it is then directed to correct API/UI via a mechanism of the service suite (or via a service suite container gateway) or via the API/UI of the service if the service is a standalone service. The instance controller 112 directs the user 101 to an existing tenant instance or to the management plane module 130 to create a new instance for a new tenant. As discussed above, the management plane module 130 may create or discard service suite instances based on the need to scale out or to scale in. The need to scale may be determined by performance and SLA requirements. In such cases, the management plane module 130 may provide load balancing using the infrastructure 128 to determine which service suite instance the service request should go to among the service suite instances available to the user 101. In one example, the management plane module 130 may provision the service suite instances 120a-n. The management modules 125 may be integrated into the management plane module 130 as a shared management module for all containerized service suites 118a-n of the same tenant or may be separated from the management plane module 130 as shown in FIG. 1B discussed in more detail below. In this case, the management module 125 may perform scaling, load balancing and routing tasks. In one example, when a service suite instance is deployed, the management plane module 130 may instruct the shared management module 125 to scale out the service inside the service suite instance instead of creating a new complete service suite instance when performance (or SLA) dictate when too many users of the tenant use the service suite instance. In one example, a session may be created by the management module 125a between the user 101 and the service suite instance 120a inside the containerized service suite 118a that provides the user with access to the services 124a. If the management plane module 130 does not detect a deployed service suite instance of the tenant A for the requested service suite, then a service suite instance may be created for the requested service suite by the management plane module 130. As discussed above, the use of the containerized suites allows for fast and efficient creation, scaling in and out of service suite instances as compared to applications running on a physical host or inside a Virtual Machine (VM) that may need to have a previously created service suite instance to be used as a VM. In one example, a service suite may not be containerized and may be implemented on a physical host or the service suite or its components may be running inside a Virtual Machine (VM). In this case, a pool of unsigned service suite instances residing on a set of physical hosts or inside a set of VMs may be used to act in the same manner as a containerized service suite without any losses in speed. The service suite instances of the pool are made available to be deployed for tenants and may be returned back to the pool once they are no longer used by the tenants. This may be particularly important when the service suites or services have components that may be deployed on-premise by a user's choice or by implementations of the service or the service suite. In this case, the use of the pool may allow for fast instantiation of tenant instances or for scaling out when a user needs a better performance.

As discussed above, service suite instances may consist of containerized service instances that interact with each other. Also, each service suite instance may include a management module, such as management modules 125a-n. The management modules 125a-n may scale in or scale out the services 124a-n based on the loads and SLA requirements. In one example, multiple service suite instances (different scaled instances or different suites offering different services) of a tenant may share the same management module implemented on the management plane module 130 as shown in FIG. 1B discussed below. The management modules 125a-n may serve as a gateway into the containerized service sites 118a-n for management functions of the service suite instance. For example, the management modules 125a-n may monitor usage of the services 124a-n and collect usage data. In one example, the instance controller 112 may request the usage data from the management module via the management plane module 130, which has access to the management modules 125a-n inside the containerized service sites 118a-n. If the usage data indicates that the service suite instance has been idle for a predetermined period of time, the instance controller 112 may instruct the management plane module 130 to terminate the service suite instance. Also, the management plane module 130 may monitor whether any users are currently using service suite instances. If no users are using a service suite instance, such as no more sessions exist between users and a service suite instance, the instance controller 112 may instruct the management plane module 130 to scale in by retiring the service suite instance. The instance controller 112 may detect overloads of the service suite instances 120a-n. If the service instance does not meet SLA requirements or other performance objectives, the management plane module 130 may create another instance (i.e., scale out) of the same service suite to balance the load among the existing service suite instances of the same tenant. Likewise, the management plane module 130 may scale in (i.e., terminate) the instances if the instance controller 112 detects idle service instances or if a user or several users log out from the tenant portal 110 and the load decreases. Note that while service suite instances 120*a*-120*n* may be scaled, the scaling in and out may also take place at the level of services 124*a-n*. In other words, a single service within a suite may have several instances that may be scaled in and out based on tenant's needs.

In an example, to terminate a service suite instance, the management plane module 130 may send a command to the respective management module 125*a-n* of the service suite instance 120*a-n* that is to be terminated. Then, the management module 125*a-n* of the service suite instance may terminate execution of all services 124*a-n* and may report back to the management plane module 130, which, then may notify the instance controller 112 that the service suite instance can be terminated. The instance controller 112 may instruct the management plane 130 to terminate the service suite instance, which releases the infrastructure 128 resources used by the service suite instance back to an available pool of resources.

In one example, the tenants may represent different lines of business (LoBs) that may access or develop their specific solutions provided by the service suites. The management plane module 130 may be exposed to a central controller that may track all systems. The management plane module 130 may manage the instances of the different LoBs. Developers may use containerized suite environment to develop, test and release their applications that may be offered as SaaS through the same mechanism as existing services. In one example, the service suites may have SaaS components as well as on-premise suites or components. In this situation, the management plane module 130 may remotely manage the on-premise suites that may be treated as remotely managed appliances. In one example, a service suite may reside on-premise and the management plane module 130 may manage that service suite remotely. Therefore, the containerized service suite 118*a-n* may expose all its APIs to the management plane module 130 to be remotely managed and remotely updated (including self-updates). The management module 125*a-n* may operate in an auto manage mode.

FIG. 1B shows an example of the same system 100 shown in FIG. 1A but having different implementation details. In this example, the management module 125 may be integrated into the management plane module 130 as a shared management module for all containerized service sites 118*a*. Additionally, the management module 125 may manage containerized service 118*b*. In this example, service (application) 124*b* may be provisioned to the tenant B as a containerized service 118*b*. The management plane module 130 may create several service instances 120*b* of the service 124*b*. The management module 125 may balance the loads on the service suite instances 120*a* and on service instances 120*b* by scaling out the service. The management module 125 may also route user service requests to instances based on loads. The components of the system 100 may include machine readable instructions stored on a non-transitory computer readable medium to perform the operations described herein. The machine readable instructions may be executed by at least one processor. Also, the system 100 may include other components not described herein, such as additional components for provisioning resources in a cloud environment.

Figure 2:
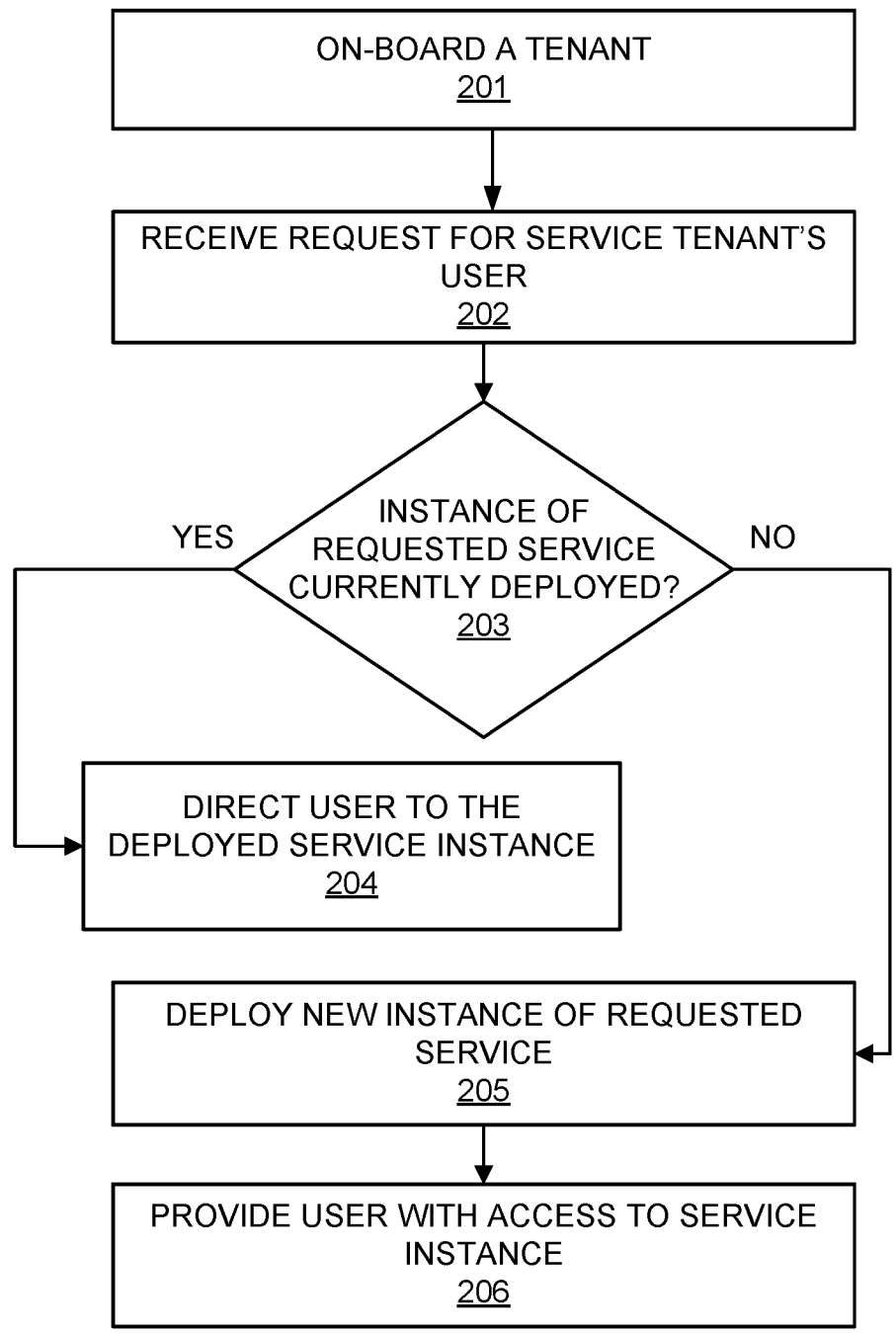
FIGS. 2-3 show example methods.
Figure 3:
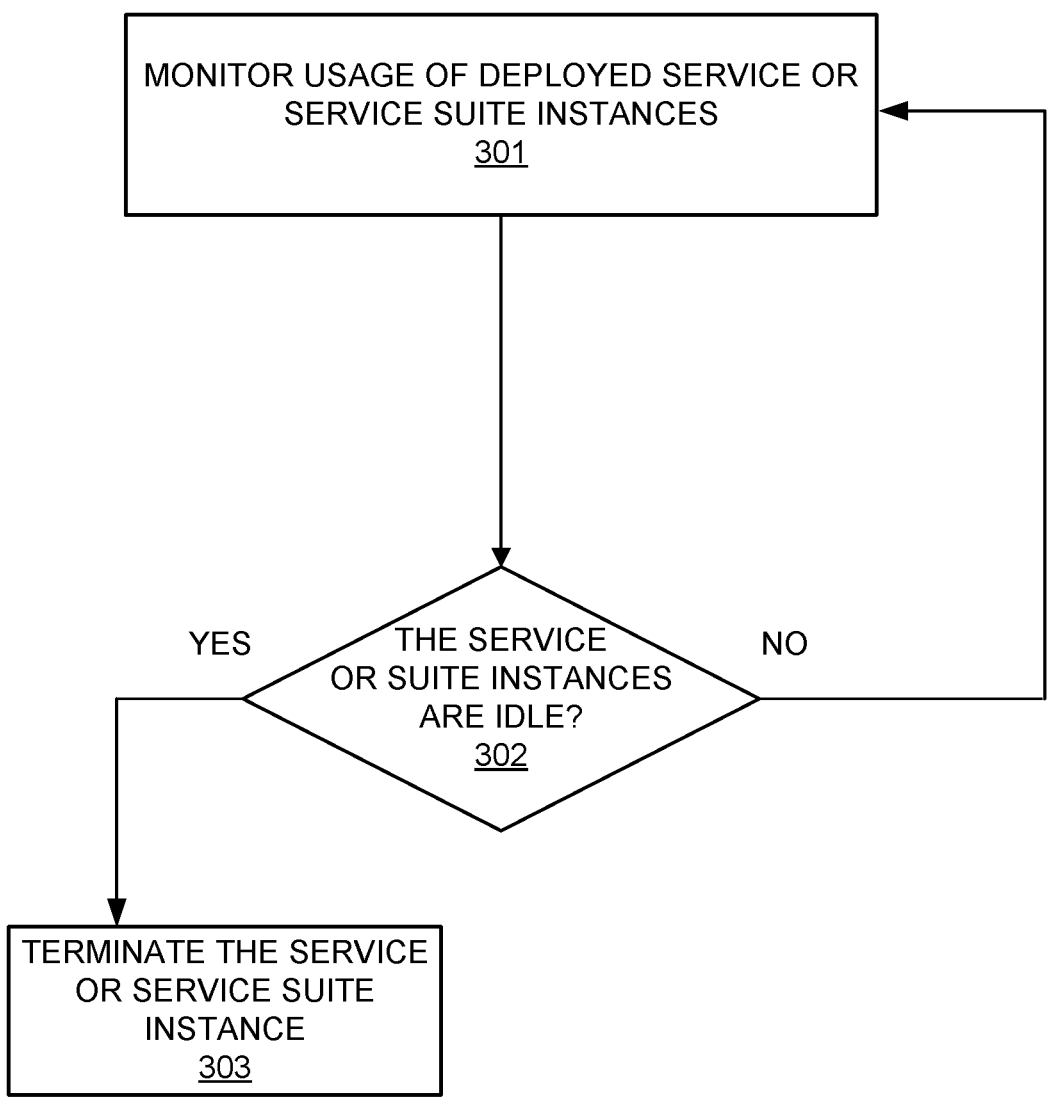

FIGS. 2-3 show examples of methods. The methods are described by way of example as being performed by the system 100 shown in FIGS. 1A-1B but may be performed by other systems. In an example, the methods and other processes described herein may be performed by a processor executing machine readable instructions stored on a non-transitory computer readable medium.

FIG. 2 shows a method 200, according to an example of the present disclosure. At 201, a tenant may be on-boarded to the system 100 through the tenant portal 110 (see FIG. 1A) first to define what tenant user authentication and authorization method are to be used. The tenant on-boarding may specify what services or service subscriptions are available to the tenant users. A user of a tenant may login into the tenant portal 110 and request a service or a service suite. The tenant may be on-boarded to the system 100 through tenant portal 110 (see FIGS. 1A-1B) first to define what tenant user authentication and authorization method are to be used. The on-boarding procedure may define how to identify an authorized user that belongs to an on-boarded tenant. For example, a user may authorize himself by a simple sign up, or may be authenticated or preapproved by a third party. The tenant on-boarding (for example via a SaaS portal) depicted in FIGS. 1A-B may specify what services or service subscriptions are available to the tenant's users. At 202, a request for a service is received from a user of a tenant via a UI or via an API exposure gateway. For example, the system 100 receives the request from the user 101 via the tenant portal 110 (e.g., SaaS portal) or an API exposure gateway. The tenant framework services 114 may authenticate the user 101. In an example, the user 101 may be presented with a list of services that the user 101 is authorized to use via the tenant portal 110. The user may select a service or a service suite. In one example, the user 101 may be directed to an appropriate service if an entry point exists. Prior to receiving a service request from the user 101, the tenant of the user 101 is on-boarded. The tenant on-boarding process may include tenant sign up or subscription via UI or via API exposure gateway of the tenant portal 110, which may be implemented as a SaaS portal. The tenant may provide payment details and select service plans via the SaaS portal. Additionally, the tenant may establish the procedure for the tenant users to log in and to be authenticated.

At 203, a determination is made as to whether an instance of the requested service (or service suite) is deployed for the tenant in the system 100. The instance controller 112 may determine whether the requested service suite is currently deployed. For example, the requested service may be deployed for another user of tenant A, such as service suite instance 120*a*, and the instance controller 112 determines whether an instance of the requested service suite is deployed for tenant A. In an example, the management plane module 130 may maintain a list of deployed services suites or services for each tenant. The instance controller 112 queries the management plane module 130 to determine if tenant A already has the requested service suite or service deployed. In another example, the instance controller 112 may maintain the list of deployed services suites or services for each tenant.

At 204, if an instance of the requested service suite or service is currently deployed, the user is directed to the deployed service suite or service instance. For example, the instance controller 112 directs the user 101 to the service suite instance 120*a*. This may include instructing the management module 125*a* to allow creation of a session between the user 101 and the service suite instance 120*a*. In an example, the instance controller 112 may send the instructions to the management plane module 130, and the management plane module 130 may communicate with the management module 125*a* through the service suite container 118*a* to create the session with the user 101. The management plane module 130 may include a virtual bridge that allows communication with management modules 125*a-n* running in the containerized service sites 118*a-n*. When the containerized service sites 118*a-n* are created, the containerized service sites 118*a-n* may include settings that allow communication with the management plane module 130.

At 205, if an instance of the requested service suite or service is not currently deployed, a new instance of requested service suite or service is deployed for the tenant. For example, the instance controller 112 creates a new instance of the requested service suite or service for the tenant A. In an example, a containerized image of the requested service suite or service is deployed on the infrastructure 128. At 206, the user is provided with access to the deployed service suite or service instance. For example, a session may be created for the user 101 to access the deployed service suite instance 120*a-n*.

FIG. 3 shows a method 300, according to an example of the present disclosure. At 301, usage of a deployed service or service suite instance is monitored. For example, the management plane module 130 and/or the instance controller 112 may maintain a list of currently deployed services or service suite instances. Also, the management modules 125*a-n* may monitor usage of respective service suite instances 120*a-n*. Monitoring usage may include monitoring active user sessions with a service suite or service instance. Monitoring usage may include monitoring computer resource metrics of the container, such as central processing unit (CPU) usage, memory usage, network usage, and block input/output (I/O) usage, of the container by the respective management module. The management modules 125*a-n* may also monitor processes of the service suite instances 120*a-n*. The management modules 125*a-n* may expose the monitored usage to the management plane module 130 and/or the instance controller 112. Each of the deployed service suite instances or service instances may be monitored.

At 302, a determination is made as to whether the monitored service suite or service instance is idle based on the monitoring performed at 301. For example, the management module 125*a* determines whether the service suite instance 120*a* is idle based on active users and/or monitored computer resource metrics of service suite instance 120*a*. If there are no users for the service suite instance 120*a*, such as no active user sessions, then the service suite instance 120*a* may be considered idle. If there are no active processes, then the service suite instance 120*a* may be considered idle. If the monitored computer resource metrics indicate that there is no activity for the service suite instance 120*a* for a predetermined period of time or that the usage is below a predetermined threshold for a predetermined period of time, then the service suite instance 120*a* may be considered idle. In an example, a combination of the monitored user sessions, processes and/or computer resource metrics may be considered to determine whether the service suite instance 120*a* is idle. A determination of whether the service suite instance is idle may be made for each of the deployed service suite instances 120*a-n*. In one example, the service suite instance usage may lead to performance issues because of an overload of the service suite instance due to too many users or to large loads created by a user. In this case, the management plane 130 may automatically scale out the instance by creating more instances of the same service suite for a tenant to improve the performance and to maintain SLA guarantees. In one example, when a new user joins, the management plane 130 may create a new service or service suite instance to avoid overloading and drop in performance. Likewise, the management plane 130 may scale in by reducing the number of service or service suite instances if a user or a number of users log out or if the load is down.

In an example, the management module of the service or the service suite instance being monitored determines whether the service or the service suite instance is idle. If the service or the service suite instance is determined to be idle, then the management module may send a notification to a module outside the container. For example, the management module 125*a* may send a notification to the management plane module 130 and/or the instance controller 112 indicating the service suite instance 120 is idle. In another example, the management module 125*a* may send the monitored usage information discussed above to the management plane module 130 and/or the instance controller 112 to make the determination of whether the service suite instance 120 is idle. In an example, if the monitored usage information is sent to the management plane module 130, the management plane module 130 may determine whether the service suite instance 120 is idle based on the monitored usage information, and notify the instance controller 112 if the service suite instance 120 is idle.

If the service or the service suite instance is determined to be idle for a pre-defined period of time, then the service or the service suite instance is terminated at 303. For example, the instance controller 112 terminates the service suite instance 120*a* if the service suite instance 120*a* is determined to be idle based on its usage monitoring. For example, a container stop command or a terminate command may be generated to terminate the containerized service suite 118*a* including the service suite instance 120*a*. The command may be executed by a container management engine which may be part of the instance controller 112 or which may be external to the instance controller 112. If the service or the service suite instance is determined not to be idle at 302, then the service or the service suite instance continues to be monitored at 301. The method 300 may be performed for each deployed service suite instance. The service or the service suite instance usage may lead to performance issues because of an overload of the service or the service suite instance. In this case, the instance controller 112 may create more instances of the same service or the service suite for a tenant to improve or maintain the performances. In one example, when a new user joins, the instance controller 112 may create a new service or a service suite instance to scale out and to maintain performance level and to avoid SLA violation. Likewise, if a user or several users log out and the load is decreased, the instance controller 112 may scale in by terminating a service or a service suite instance or several instances while maintaining performance SLA.

Figure 4:
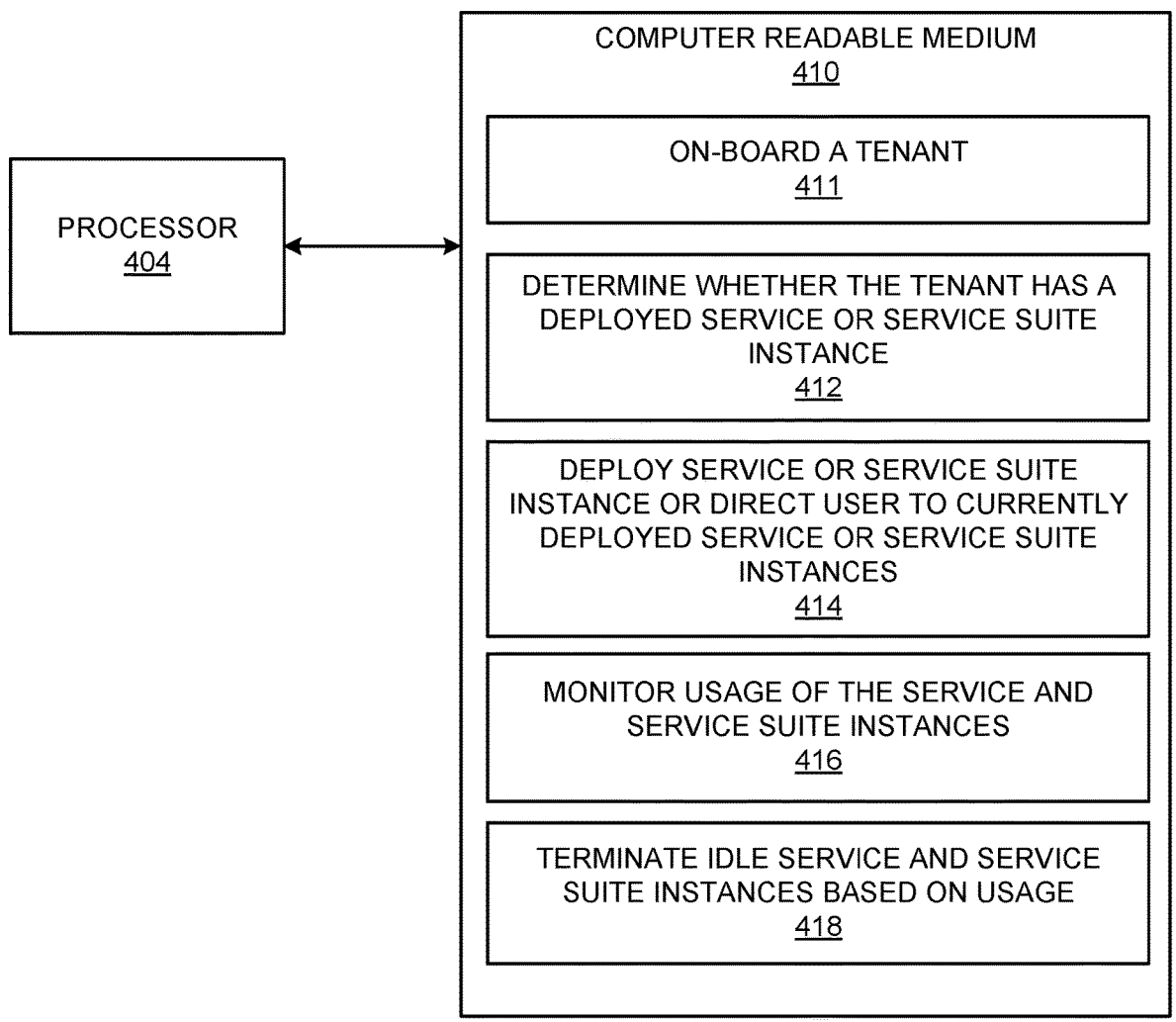
FIG. 4 shows an example computer system platform for components of the service provisioning system.

FIG. 4 shows a block diagram of computer system 400 that may be a platform for components of the system 100, including but not limited to tenant portal 110, tenant framework services 114, integration layer 116, instance controller 112, management plane module 130 and/or management modules 125*a-n*. It should be understood that the computer system 400 may include additional components and that some of the components described herein may be removed and/or modified without departing from a scope of the computer system 400 disclosed herein.

The computer system 400 may include a processor 404. The processor 404 may be a semiconductor-based microprocessor, a central processing unit (CPU), an application specific integrated circuit (ASIC), a field-programmable gate array (FPGA), and/or another hardware device. The processor 404 may include multiple processors.

The computer system 400 may also include non-transitory computer readable medium 410 that may have stored thereon machine-readable instructions executable by the processor 404. Examples of the machine-readable instructions are shown as 411-418 and are further discussed below. Examples of the non-transitory computer readable medium 410 may include an electronic, magnetic, optical, or other physical storage device that contains or stores executable instructions. For example, the non-transitory computer readable medium 410 may be Random Access memory (RAM), an Electrically Erasable Programmable Read-Only Memory (EEPROM), a hard disk, an optical disc, or other type of storage device.

A tenant may be on-boarded to the system 100 the tenant portal 110 (see FIG. 1A) first to define what tenant user authentication and authorization method are to be used. The tenant on-boarding may specify what services or service subscriptions are available to the tenant users. The processor 404 may fetch, decode, and execute the machine-readable instructions stored in the non-transitory computer readable medium 410. The processor 404 may fetch, decode, and execute the machine-readable instructions 411-418. For example, the machine-readable instructions 411 may be executed to on-board a tenant so a user of a tenant may login into the tenant portal 110 and request a service or a service suite the tenant is subscribed to. The tenant may be on-boarded to the system 100 through tenant portal 110 (see FIGS. 1A-1B) first to define what tenant user authentication and authorization method are to be used. The on-boarding procedure defines how to identify an authorized user that belongs to an on-boarded tenant. For example, a user may authorize himself by a simple sign up, or may be authenticated or preapproved by a third party. The tenant on-boarding (for example via a SaaS portal) depicted in FIGS. 1A-1B may specify what services or service subscriptions are available to the tenant's users. The machine-readable instructions 412 may be executed to determine whether the tenant has a currently deployed service or a service suite instance for a requested service. The request for the service or the service suite may be received via the tenant portal 110. The machine-readable instructions 414 may be executed to deploy a service or a service suite instance for the requested service if it is not already deployed or direct the user to the respective service or service suite instance if it is currently deployed. The machine-readable instructions 416 may be executed to monitor usage of deployed service are service suite instances, and the machine-readable instructions 418 may be executed to terminate service or service suite instances determined to be idle based on the monitored usage. As discussed above, the service or the service suite instance usage may lead to performance issues because of too many users or overloads of the service instance or the service suite instance. In this case, the instance controller 112 may create more instances of the same service or the service suite for a tenant to improve the performances. In one example, when a new user joins, the instance controller 112 may create a new service or service suite instance to avoid overload and subsequent drop in performance of the existing service suite instance.

As discussed above, a user may deploy software packaged in a service suite (i.e., an integrated set of applications or a bundle of applications). The user may decide not to install all of the components of the applications available from the suite, because the user may already have the same or older version or a customized version of an application in the suite or simply may have another application that provides the same features. In such cases, when the user runs some applications from the service suite, the applications deployed outside the service suite need to be located. Also, a service from within the suite (application/service/component) may need to interact with another component/service/application that is not installed inside the suite or has been moved and is provided elsewhere externally (e.g. installed outside the suite (not as a container) or installed with another installation of the suite (as container) or installed stand alone. For example, the external component may be another version, another installation, or another instance, from another suite located in another domain/cloud/data center or used for another context by other applications of the service suite. In some cases, integration of the external components may involve finding some other components not installed within the suite. Likewise, the components that are not installed within the suite may find and access the components of the service suite. This situation may be addressed by configuration of the service suite at its installation. The service suite may also be dynamically reconfigured, because the external components may be modified, reinstalled, removed, etc. The system facilitates execution of services from inside the service suite and external to the service suite.

In one example of the present disclosure, a containerized service suite may be deployed on-premise or on a cloud infrastructure. The service suites may include different containerized and non-containerized products such as applications (services). Some of the applications of the service suite may be executed inside their own containers and act as micro-services. Also, some of the application components may not be containerized inside the service suite. For example, a containerized service suite may have an external legacy application (virtual or physical) component that is not containerized or not yet containerized. These components may be deployed outside the containerized service suite. Users may want to keep some of their applications that they use (have integrated and customized), and may want to deploy some of the components from the service suite. In one example, mixed or hybrid deployment of different components (or subsets of components) within the containerized suite with different combinations of external components deployed from outside the containerized suite may be provided. The combination may change dynamically because a user may decide to use or not to use an external to the service suite component. Then, later the user may decide to use the containerized service instead of the external component or may want to have a selection of service to be based on a deployment context.

In one example, the service suite applications may be configured to indicate that a service API is provided for every service within the suite by default (e.g., a representational state transfer (REST) uniform resource locator (URL). If the suite uses a service that is external to the containerized suite, the address of the service may be updated dynamically. According to examples of the present disclosure, a requested service (or component) address may be found by using a domain name system (DNS) server that performs the address mapping. In an example, an API routing gateway (GW) may proxy and route the request to the address determined by the DNS server or any other registry. In one example, the API may be used to configure a location of the requested service (or component). This may be implemented at installation or at deployment. The location of the external component may be updated by the API or by an administrator. In one example, the router has a pre-defined address of the requested service (or component) and routes the request to this address. In the latter case, the service (or component) address is configured at installation of the service or the service suite. The address mapping information may be updated at deployment/configuration or when the address of the service (or a component) changes based on execution of a code that determines which component to use based on context, workflow or policy. In order to use the external service from inside the containerized suite, a suite service has to call the external service API via an API routing GW implemented on a proxy server. The API call may be sent via a proxy server and routed to the external service API using the API address. The API address may be obtained by the DNS server and may be updated inside the suite. Each of the suite services may be able to call an external service API. In one example, a proxy server may include an API routing GW for API transformation. The proxy server may also point to the API routing GW to switch the service request to the external services that are not exactly the same as the services to be provided by the suite service to be deployed from the suite. For example, different versions of the same service may be requested by the user. A user may want to use other pre-configured versions or older versions of the requested service. In one example, the gateway may be used for transformation of the API call to adapt to legacy versions if the requested application is not backward compatible.

In one example, a containerized suite of applications or services may be deployed on premise, as SaaS, in a cloud with some components being executed inside and some outside of the containerized suite. The containerized or non-containerized services may be deployed using components external to the suite versions of the applications and third-party applications or components deployed outside of the service suite. Location of an external service and routing of the API calls via a proxy to the external component location allows the suite to work as if the external component were included at deployment with the suite. Calls to and from the external component can be orchestrated and transformed to support more advanced integration use cases or to enable interaction with past versions or third party versions of the same or similar service. The API GW router provides for an ability to transform or compose the call. In one example, a user may update the settings when the user changes the location of the external service or the actual service to be deployed. The hybrid service deployment allows to use conditions that specify what services or components to be used depending on service deployment context.

Figure 5:
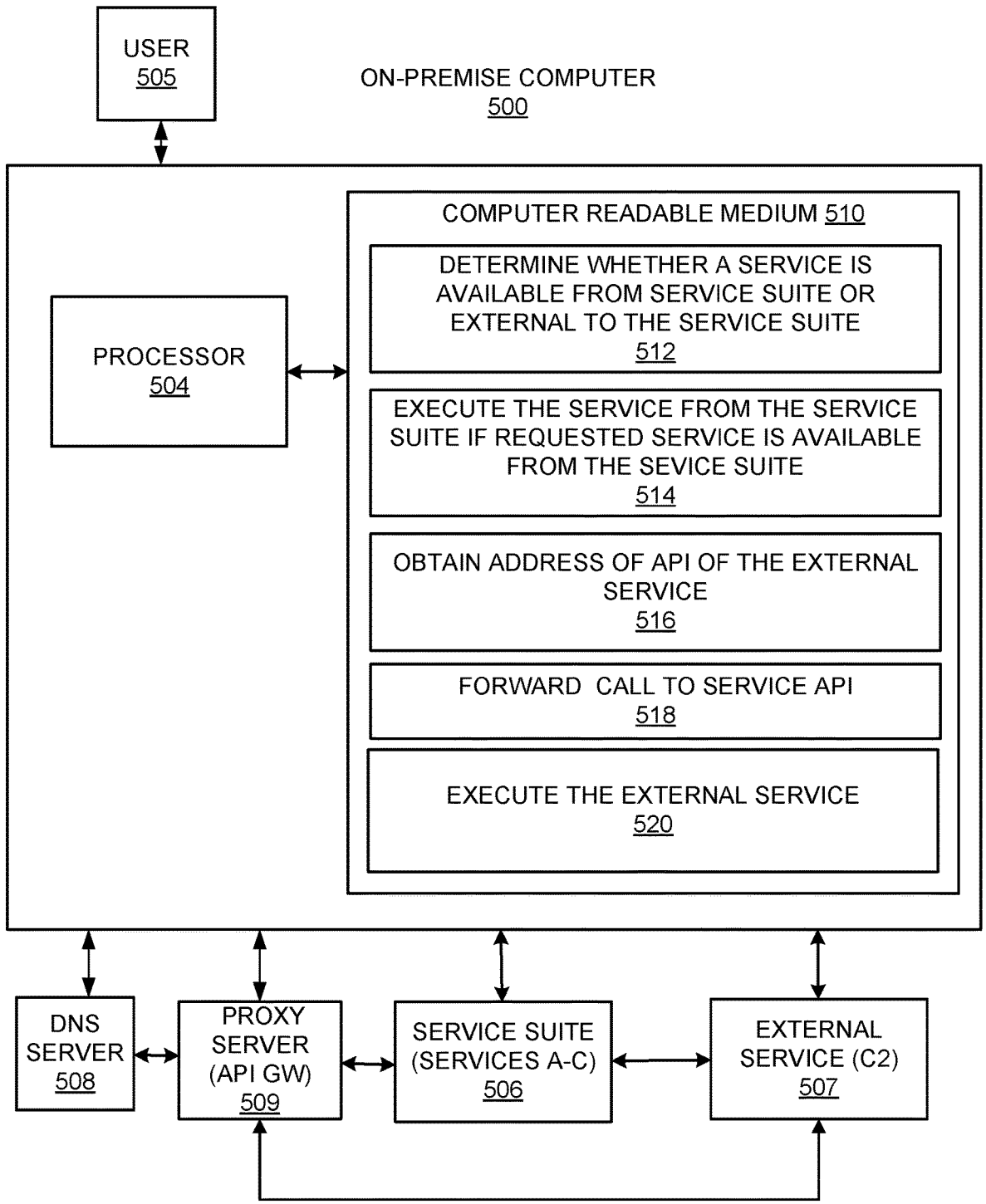
FIG. 5 shows an example computer system platform for components of the service provisioning system for hybrid service deployment.

FIG. 5 shows an example computer system 500 that may be a platform for components of the service provisioning system for hybrid service deployment. The computer system 500 illustrates an example where a service suite is to be deployed on-premise as shown by block 132 in FIGS. 1A-1B. The computer system 500 shown in FIG. 5 has access to a service suite and to external applications (or components) as is further discussed below. As is shown in FIG. 5 an external application may be on-premise. In another example, the external application may be in a containerized service suite on the cloud, such as in a containerized service suite shown in FIGS. 1A-B and accessed through the integration layer 116. In either case, the external service (application) may be executed by a computer system or a processor that is external to the computer system 500 where the service suite is deployed. It should be understood that the computer system 500 may include additional components and that some of the components described herein may be removed and/or modified without departing from a scope of the computer system 500 disclosed herein.

The computer system 500 may include a processor 504. The processor 504 may be a semiconductor-based microprocessor, a central processing unit (CPU), an application specific integrated circuit (ASIC), a field-programmable gate array (FPGA), and/or another hardware device. The processor 504 may include multiple processors.

The computer system 500 may also include non-transitory computer readable medium 510 that may have stored thereon machine-readable instructions executable by the processor 504. Examples of the machine-readable instructions are shown as 512-520 and are further discussed below. Examples of the non-transitory computer readable medium 510 may include an electronic, magnetic, optical, or other physical storage device that contains or stores executable instructions. For example, the non-transitory computer readable medium 510 may be Random Access memory (RAM), an Electrically Erasable Programmable Read-Only Memory (EEPROM), a hard disk, an optical disc, or other type of storage device.

A user 505 may request a service (or component) from a service suite 506 that provides services A-C available for execution. However, the user 505 may configure the service suite 506 so that an external service (or component C2) 507 is to be executed instead of the service C available from the service suite 506. In this case, an address of the external service (e.g., external service component C2) 507 may be found by using a domain name system (DNS) server 508 that performs the address mapping. Then, an API routing GW implemented on a proxy server 509 may route the user request to the address determined by the DNS server 508. In one example, the API routing GW has a pre-defined programmed address of the requested service (or component) and may always route the request to this address. In the latter case, the service (or component C2) 507 address is configured at installation of the service or the service suite 506. The address mapping information may be updated at deployment/configuration or when the address of the service (e.g., external service component C2) changes. The processor 504 may fetch, decode, and execute the machine-readable instructions stored in the non-transitory computer readable medium 510. For example, a user may buy a service suite 506 and request a service from the service suite 506. The processor 504 may fetch, decode, and execute the machine-readable instructions 512-520. For example, the machine-readable instructions 512 may be executed to determine whether a requested service is available from the service suite 506 or is to be executed from external the service suite 506. Note that the components needed to run the service may be containerized or non-containerized. The machine-readable instructions 514 may be executed to execute the requested service from the service suite 506 in response to the determination that the requested service is available from the service suite 506.

The machine-readable instructions 516 may be executed to obtain an address of an API of the requested service in response to the determination that the requested service is external to the service suite 506. The API address may be obtained by a domain name system (DNS) server 508 and may be updated inside the service suite. The machine-readable instructions 518 may be executed to forward a call to the service API located at the address. The machine-readable instructions 520 may be executed to execute the service from external the service suite by making the service API call. In one example, the proxy server 509 may include the API routing GW (for API transformation). The API routing GW may be configured to route the requests to the addresses of the external services, such as external service 507. If the location of the external service 507 changes, the API routing GW may be reconfigured with the new address.

The proxy server 509 may also instruct the system to switch the service request to the external service 507 to be deployed instead of the services provided by the suite service 506. The proxy server 509 may transform the API call or orchestrate it to make it, for example, conditional to a certain connection or deployment policy.

Figure 6:
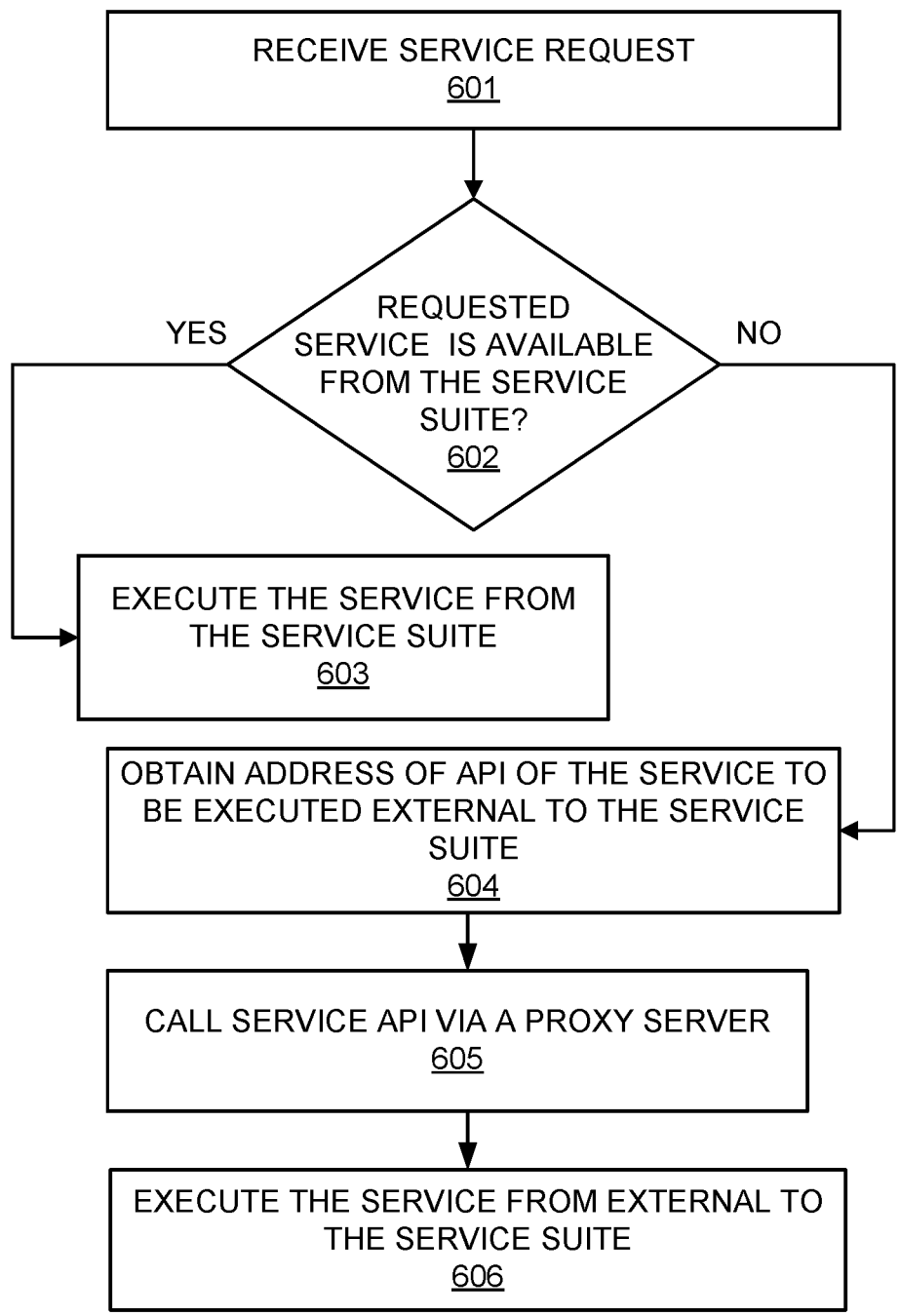
FIG. 6 shows an example method.

FIG. 6 shows a method 600, according to an example of the present disclosure. For example, the user who acquired the service suite wants to use some of the services inside the service suite and some services that are to be deployed from outside of the service suite. At 601, a service request from a service suite user is received. At 602, a determination is made as to whether the requested service is available to be executed from the service suite or from a service external to the service suite. At 603, if the requested service is to be executed from the service suite, the requested service is executed by a service in the service suite. At 604, if the requested service is external to the service suite, an address of an API of the external service is obtained, and at 605, a call to the service API, via a proxy server, is performed. At 606, the external service is executed in response to the call. According to examples of the present disclosure, the address of the external service may be: entered at installation of the service suite (without installing or deploying the external service); entered or updated when the external service is relocated; or discovered (through a discovery operation or via a registry systems), if the address of the external service is missing.

The above steps can be implemented through a user interface. Use of the external service (application) may be configured at installation. APIs, scripts or policies may determine when to use a service from the service suite or when to call an external service based on an execution context such as a tenant, a user, a requested service, etc.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A service management and provisioning system comprising:
    at least one processor; and
    a memory on which is stored machine-readable instructions executable by the at least one processor to manage service instances deployed on an infrastructure, wherein the at least one processor is to:
        deploy for a tenant a first service instance of the service instances, wherein the first service instance comprises at least one application available in a service suite;
        detect a need to scale out the first service instance from a management plane module connected to an instance controller, wherein the management plane module is to monitor usage, load, performance, and service level agreement and policy compliance of the first service instance and the infrastructure;
        instruct the management plane module to deploy a second service instance for the tenant in response to a notification of the need to scale out;
        direct the management plane module to terminate or scale in the first service instance in response to a determination that the first service instance is idle;
        determine whether a service requested by a user of the tenant is available in the service suite or is external to the service suite; and
        obtain an address of the service that is external to the service suite using a domain name system (DNS) server in response to a determination that the service requested by the user is external to the service suite, wherein a gateway routes a request for the service to the address determined by the DNS server.

2. The system according to claim 1, wherein the service management and provisioning system is to receive a request from the user for the service; and
    the at least one processor is to determine whether at least one instance of the service requested by the user is deployed for the tenant; and
    in response to a determination that the at least one instance of the service requested by the user is deployed for the tenant, direct the user to the at least one instance of the service requested by the user that is deployed for the tenant.

3. The system according to claim 2, wherein in response to a determination that the instance of the service requested by the user is not deployed, the at least one processor is to:
    deploy a containerized instance of the service requested by the user, wherein the containerized instance of the service requested by the user includes a management module; and
    provide the user with access to the containerized instance of the service requested by the user through the management module of the containerized instance of the service requested by the user.

4. The system according to claim 1, wherein the service suite is containerized and the gateway is configured with the address of the service external to the service suite, wherein the address of the service external to the service suite is:
    entered at installation of the service suite;
    entered or updated when the service external to the service suite is relocated; or
    discovered through a registry.

5. The system according to claim 1, wherein the infrastructure is to facilitate data segregation and performance level compliance.

6. The system according to claim 1, wherein the first service instance is deployed in a container and wherein at least one of the service instances comprises a single-tenant logic.

7. The system according to claim 1, wherein the at least one application is a single-tenant application offered as software as a service (SaaS).

8. The system according to claim 1, wherein the at least one processor is to create more service instances for the tenant in response to a detection of:
    an overload of the first service instance;
    a performance drop of the first service instance; or
    a service level agreement (SLA) violation.

9. The system according to claim 1, wherein to terminate the first service instance in response to the determination that the first service instance is idle, the at least one processor is to determine whether the first service instance is idle based on at least one of whether any users are using the first service instance, and whether monitored computer resource metrics of the first service instance indicate the first service instance is idle, and wherein to terminate the first service instance, the management plane module is to terminate a container containing the first service instance.

10. The system according to claim 1, wherein the service instances of the tenant are integrated to execute compositions and share data over an integration layer, wherein the integration layer is to support remote execution of services deployed on-premise and in a cloud, wherein at least one service component resides on-premise.

11. A computer-implemented method executable by at least one processor, the method comprising:
processing tenant on-boarding data for a tenant;
receiving a request for a service from a user belonging to the tenant;
determining, by an instance controller, whether an instance of the service is currently deployed for the tenant;
directing the user to the instance of the service that is currently deployed for the tenant in response to a determination that the instance of the service is currently deployed for the tenant;
deploying a new service instance of the service in response to a determination that the instance of the service is not currently deployed for the tenant;
providing the user with an access to the new service instance;
determining whether the service requested by the user belonging to the tenant is available from a service suite based on a service deployment context;
executing the service from the service suite in response to a determination that the service is available from the service suite;
in response to a determination that the service is to be executed from outside of the service suite, obtaining an address of an application programming interface (API);
forwarding a call to a requested service API via a proxy server using the address of the API; and
executing the service from outside of the service suite.

12. The method according to claim 11, wherein the tenant on-boarding data comprising instructions for:
user authentication methods;
tenant service subscriptions; and
service provisioning to tenant's users.

13. The method according to claim 11, further comprising updating the address of the API inside the service suite.

14. The method according to claim 11, wherein the service is a single-tenant application offered as software as a service (SaaS).

15. The method according to claim 11, wherein the service is deployed in a container.

16. A non-transitory computer readable medium on which is stored machine-readable instructions that when executed by a processor, cause the processor to:
process tenant on-boarding data for a tenant;
receive a request for a service from a user belonging to the tenant;
determine whether an instance of the service is currently deployed for the tenant;
direct the user to the instance of the service in response to a determination that the instance of the service is currently deployed;
deploy a new instance of the service in response to a determination that the instance of the service is not currently deployed;
provide the user with an access to the instance of the service;
monitor usage of the instance of the service and terminate the instance of the service if the instance of the service is idle for a pre-determined time period;
create a second instance of the service for the tenant in response to an overload of the instance of the service;
determine whether the service requested by the user belonging to the tenant is available from a service suite based on a service deployment context;
execute the requested service from the service suite in response to a determination that the service is available from the service suite;
in response to a determination that the service is to be executed from outside of the service suite, obtain an address of an application programming interface (API);
forward a call to a service API via a proxy server using the address; and
execute the service from outside of the service suite.

17. The non-transitory computer readable medium according to claim 16, wherein the instructions are further to cause the processor to update the address of the API inside the service suite.

* * * * *